Sept. 6, 1927.  E. BERTONE  1,641,312
TUBE CLEANER
Filed Feb. 26, 1926
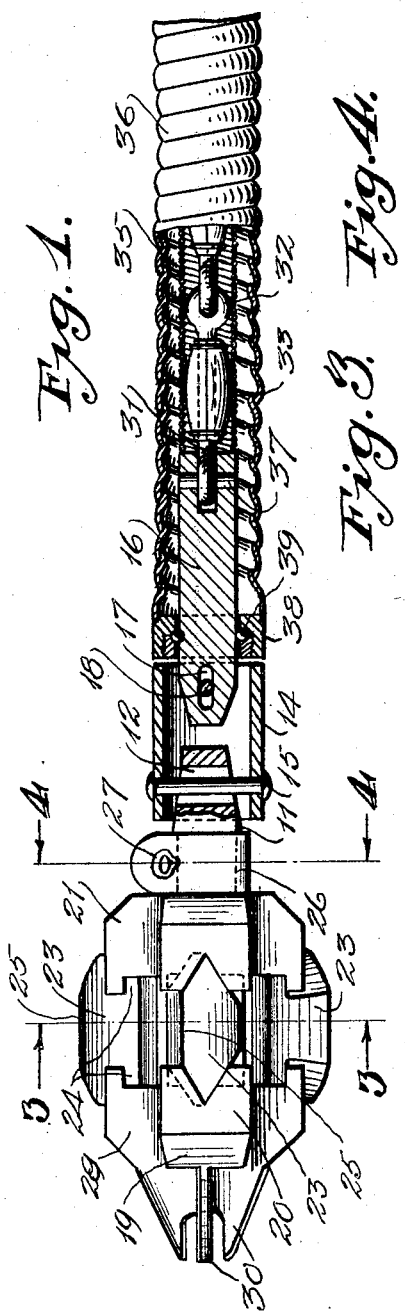
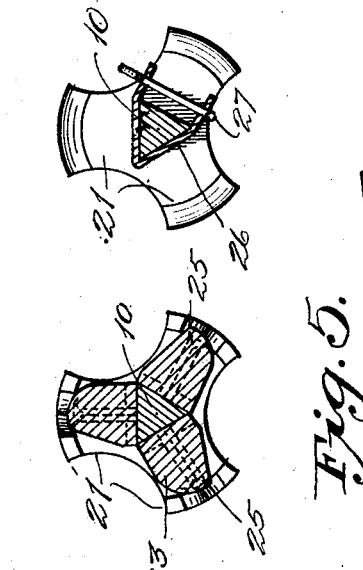
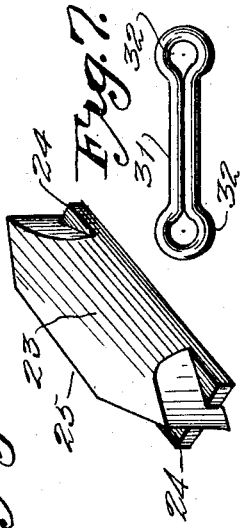
INVENTOR
Eugene Bertone
BY L. N. Willis.
ATTORNEY Patented Sept. 6, 1927.

1,641,312

UNITED STATES PATENT OFFICE.

EUGENE BERTONE, OF STEVENSON, MARYLAND.

TUBE CLEANER.

Application filed February 26, 1926. Serial No. 90,975.

This invention relates to flue and tube cleaners.

One important object of the invention is to provide an improved general construction of device of this character.

A second important object of the invention is to provide an improved tube cleaner having radially movable blades or knives projected from the body of the device solely by centrifugal force.

A third object of the invention is to provide a novel tube cleaner having knives secured in position to move radially in an improved manner permitting such knives to be readily removed and other knives of the same or different radial dimensions to be inserted in place thereof right or left.

A fourth important object of the invention is to provide an improved device of the kind having an improved arrangement of locking means for holding the blades in place.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation partly in section of the complete device.

Figure 2 is a side elevation of the scraper body with the blades removed.

Figure 3 is a section on the line 3—3 of Figure 1.

Figure 4 is a section on the line 4—4 of Figure 1.

Figure 5 is a perspective view of one of the blades.

Figure 6 is a side view partly in section through one of the links of the flexible chain drive.

Figure 7 shows a modification of such a link.

In the embodiment of the invention herein shown there is provided a cleaner body having a central shaft 10 which is preferably triangular in cross section. At one end of this shank there is provided a cylindrical portion 11 tapered toward the shank and provided with a slot 12. On this cylindrical portion is mounted a sleeve 14, a pin 15 extending through this sleeve and the slot to secure the sleeve in position. This sleeve is loose on the portion 11 so that it may tilt thereon as when the device is used in a pipe having one or more curves or bends therein. In the opposite end of the sleeve is received one end of a short shaft 16 having a slot 17 therein and through the sleeve and slot 17 passes a pin 18 arranged at right angles to the pin 15. The end of the shaft fits loosely in the sleeve and is beveled to permit tilting and thus the sleeve and its connections form a species of loose universal joint enabling the cleaner to traverse flues and pipes having very short bends.

At the end of the shank opposite the portion 11 there is secured a head having three arms 19 extending from the flat faces of the shank and provided with rectangular terminal portions 20 provided with stops 20' on their outer ends each having a V-shaped groove formed in its end face, said grooves radiating from the axis of the body. Slidable on the shank is a sliding head having arms 21 and grooves 22 like those of the fixed head; the grooves in the two heads being opposed. Each pair of grooves holds a blade 23 having V-shaped ends fitting the grooves and provided at each end with lugs 24, these lugs engaging, upon the blades moving outwardly, with the inner faces of the stops 20' of respective arms. Each blade is, of course, provided with a cutting edge 25. The length of these blades is such that movement of the sliding head toward the cylindrical end of the shank permits the blades to be withdrawn. Thus any desired number of sets of blades may be interchangeably used in the same head and the depths or radial dimensions of these sets may be different so that the effective working diameter of the tool may be changed by simply substituting one set of blades for another, each set having a considerable range owing to the blades being radially movable. Thus the tool may be used for any sized tubing, pipe, flues or the like. To hold the sliding head in position on the shank to secure the blades from release various means may be used but there has been here shown a yoke 26 shaped to fit the shank and of proper width to fit between the end 11 and the sliding head upon the latter being moved to engage the blades. This yoke is kept from dropping off by an ordinary cotter pin 27.

To the fixed head may be secured a boring device for use whenever the tube or pipe is so choked as to prevent the head being forced through the same. This boring device preferably consists of a base 28 which is removably secured to the fixed head as by a nut 29 and projecting from this base are substantially triangular cutter blades 30.

In order to drive the cleaner there is provided a flexible chain consisting of a series of links each having a shank 31 terminating at each end in an eye 32, the eyes of adjacent links being engaged. On the shank of each link is a spindle shaped drum of fibre or other suitable material 33 formed of two longitudinally extending halves and each end of the drum is circumferentially grooved to receive a snap ring 34 by which the halves are held together. Enclosing these links is a coiled spring 35 which embraces the bearings and by reason of the spindle shape of said bearings the spring and chain may be bent to a small radius for use in tubes having abrupt bends. This spring is held out of contact with the chain by the drums and is thus kept from getting hot under heavy duty. Outside the spring is a flexible metallic tube 36 and one end of this tube surrounds a portion of the short shaft 16, this end being slotted to receive one end of the chain and a pin 37 passing through the shaft end and the eye of said link to hold the chain to the shaft. Surrounding the shaft 16 about midway of its length is a bushing 38, ball bearings 39 being provided to allow the shaft to run freely in this bushing. The end of the flexible tube 36 is secured to the bushing by brazing or the like. The flexible shaft is driven by some suitable motive power (not shown) and in use the head is inserted in the flue to be cleaned. As the head rotates the blades will be forced outwardly by centrifugal force and will scrape the flue clean. The tube 36 is fed slowly into the flue, the flexibility of the parts permitting it to pass around any bends in said flue and thus the entire flue is quickly cleaned.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a tube cleaner, a body having a shank provided with a fixed head at one end, a sliding head mounted on said shank, said heads being provided with arms having stops at their outer ends, the stops on each head extending toward the other head, confronting grooves formed in said ends substantially radial to the axis of the head, blades having ends engaged in said grooves to move toward and from said axis, lugs carried by said blades adapted to engage the stops to limit outward movement of the blades and means to prevent movement of the sliding head away from said blades.

2. In a tube cleaner, a body having a shank provided with a fixed head at one end, a sliding head mounted on said shank, said heads being provided with arms having stops at their outer ends the stops on each head extending toward the other head, confronting grooves formed in said ends substantially radial to the axis of the head, blades having ends engaged in said grooves to move toward and from said axis, lugs on the inner corners of the blades engageable with the stops as the blades move outwardly, and means to prevent movement of the sliding head away from said blades.

3. In a tube cleaner, a body having a shank provided with a fixed head at one end, a sliding head mounted on said shank, said heads being provided with arms having stops at their outer ends, the stops on each head extending toward the other head, confronting grooves formed in said ends substantially radial to the axis of the head, blades having ends engaged in said grooves to move toward and from said axis, an enlargement on the end of the shank opposite the fixed head, a yoke embracing the shank between the enlargement and the sliding head, and a pin extending through the ends of the yoke.

4. In a tube cleaner, a body having a shank provided with a fixed head at one end, a sliding head mounted on said shank, said heads being provided with arms having stops at their outer ends, the stops on each head extending toward the other head, confronting grooves formed in said ends substantially radial to the axis of the head, blades having ends engaged in said grooves to move toward and from said axis, an enlargement on the end of the shank opposite the fixed head, a yoke embracing the shank between the enlargement and the sliding head, a pin extending through the ends of the yoke, and lugs on the inner corners of the blades engageable with the stops as the blades move outwardly.

In testimony whereof I affix my signature.

EUGENE BERTONE.